US012460269B2

(12) United States Patent
Lo et al.

(10) Patent No.: US 12,460,269 B2
(45) Date of Patent: Nov. 4, 2025

(54) METHODS FOR ANALYZING VIRAL NUCLEIC ACID

(71) Applicant: GRAIL, Inc., Menlo Park, CA (US)

(72) Inventors: Yuk-Ming Dennis Lo, Hong Kong (CN); Kwan Chee Chan, Hong Kong (CN); Weng In Chu, Hong Kong SAR (CN)

(73) Assignee: GRAIL, Inc., Menlo Park, CA (US)

( * ) Notice: Subject to any disclaimer, the term of this patent is extended or adjusted under 35 U.S.C. 154(b) by 328 days.

(21) Appl. No.: 16/245,811

(22) Filed: Jan. 11, 2019

(65) Prior Publication Data

US 2019/0218625 A1 Jul. 18, 2019

Related U.S. Application Data

(60) Provisional application No. 62/617,079, filed on Jan. 12, 2018, provisional application No. 62/718,290, filed on Aug. 13, 2018.

(51) Int. Cl.
*C12Q 1/00* (2006.01)
*C12Q 1/6886* (2018.01)
*C12Q 1/70* (2006.01)

(52) U.S. Cl.
CPC ............. *C12Q 1/70* (2013.01); *C12Q 1/6886* (2013.01); *C12Q 1/705* (2013.01)

(58) Field of Classification Search
None
See application file for complete search history.

(56) References Cited

U.S. PATENT DOCUMENTS

| | | | |
|---|---|---|---|
| 2008/0206749 A1* | 8/2008 | Lo ..................... | C12Q 1/6886 435/6.14 |
| 2017/0037132 A1* | 2/2017 | Manekas ............ | G01N 33/5743 |
| 2017/0073774 A1 | 3/2017 | Lo et al. | |
| 2018/0237863 A1 | 8/2018 | Namsaraev et al. | |

FOREIGN PATENT DOCUMENTS

| | | |
|---|---|---|
| WO | WO-2018081130 A1 | 5/2018 |
| WO | WO-2019140226 A1 | 7/2019 |

OTHER PUBLICATIONS

Chan et al. Early Detection of Nasopharyngeal Carcinoma by Plasma Epstein-Barr Virus DNA Analysis in a Surveillance Program. Cancer 2013;119:1838-44.*
Yip et al. Application of circulating plasma/serum EBV DNA in the clinical management of nasopharyngeal carcinoma. Oral Oncology 50 (2014) 527-538.*
Chang et al. The Enigmatic Epidemiology of Nasopharyngeal Carcinoma. Cancer Epidemiol Biomarkers Prev 2006;15(10):1765-77.*
Laantri et al. Environmental, genetic and viral risk factors of nasopharyngeal carcinoma in North Africa. BMC Proceedings 2011, 5(Suppl 1):P30.*
"Room temperature" from Wikipedia (https://en.wikipedia.org/wiki/Room_temperature. Downloaded from internet on Apr. 12, 2022).*
Chan et al. (Cancer 2013;119:1838-44; of record in the Office action mailed on Dec. 17, 2019).*
Boonarkart et al., "Exposure to cold impairs interferon-induced anti-viral defense", Arch Virol, 162, 2231-7, 2017.
Chan et al., "Ambient Temperature and Screening for Nasopharyngeal Cancer", The New England Journal of Medicine, Mar. 1-2, 2018.
Chan et al. "Analysis of plasma Epstein Barr virus DNA to screen for nasopharyngeal cancer", New England Journal of Medicine, vol. 377, No. 6, 513-22, Aug. 10, 2017.
Hsiao et al., "Detection of Cell Free Epstein-Barr Virus DNA in Sera from Patients with Nasapharyngeal Carcinoma", Cancer, vol. 94, No. 3, 723-729, Feb. 1, 2002.
Ling-Ling Tang et al., "Global trends in incidence and mortality of nasopharyngeal carcinoma", Cancer Letters, vol. 374, 22-30, 2016.
Magrath et al., "Enhancement of Epstein-Barr virus replication in producer cell lines by combination of low temperature and corticosteroids", Virology, 97, 477-81, 1979.
Santpere et al., "Genome-Wide Analysis of Wild-Type Epstein-Barr Virus Genomes Derived from Healthy Individuals of the 1000 Genomes Project", Genome Biol. Evol. 6, 4, 846-860, Mar. 28, 2014.
Thomasini et al., "Aged-associated cytomegalovirus and Epstein-Barr virus reactivation and cytomegalovirus relationship with the frailty syndrome in older women", PLoS One, 12(7), 1-12, Jul. 10, 2017: e0180841.
Tsuchiya, Shigeru, "Diagnosis of Epstein-Barr virus associated diseases", Critical Reviews in Oncology/Hematology, 44, 227-238, 2002.
Wei et al., "Current Management Strategy of Nasopharyngeal Carcinoma", Clinical and Experimental Otorhinolaryngology, vol. 3, No. 1, Mar. 1-12, 2010.
W.K. Jacky Lam et al., "Sequencing-based counting and size profiling of plasma Epstein-Barr virus DNA enhance population screening of nasopharyngeal carcinoma", Proc Natl Acad Sci USA (PNAS), vol. 115, No. 22, E5115-E5124, May 29, 2018.
Xu et al., "An epidemiological and molecular study of the relationship between smoking, risk of nasopharyngeal carcinoma, and Epstein-Barr virus activation", J Natl Cancer Inst, 104, 1396-1410, 2012.
Y.M. Dennis Lo et al., "Quantitative Analysis of Cell-free Epstein-Barr Virus DNA in Plasma of Patients with Nasopharyngeal Carcinoma" Cancer Research, vol. 59, 1188-1191, Mar. 15, 1999.
Ling et al. The dynamics of herpesvirus and polyomavirus reactivation and shedding in healthy adults: a 14-month longitudinal study. The Journal of Infectious Diseases; 187 (10); pp. 1571-1580 (2003).
Lv et al. Cigarette smoking complements the prognostic value of baseline plasma Epstein-Barr virus deoxyribonucleic aci in patients with nasopharyngeal carcinoma undergoing intensity-modulated radiation therapy: a large-scale retrospectie cohort study. Oncotarget; 7(13) pp. 16806-16817 (2016).

(Continued)

*Primary Examiner* — Nianxiang Zou
(74) *Attorney, Agent, or Firm* — Greenberg Traurig, LLP (57) ABSTRACT

Provided herein are methods, systems, and computer readable medium for detecting nucleic acid from a pathogen, e.g., virus, e.g., Epstein-Barr virus (EBV), in a cell-free nucleic sample from an individual at risk of a condition, e.g., nasopharyngeal carcinoma (NPC). The methods, systems, and computer readable medium can be used to screen for the presence of the condition, e.g., NPC, using thresholds adjusted based on sample attributes.

28 Claims, 5 Drawing Sheets

(56) References Cited

OTHER PUBLICATIONS

PCT/US2019/013241 International Search Report dated Apr. 10, 2019.
Tay et al. The role of espstein-barr virus DNA load and serology as screening tools for nasopharyngeal carcinoma. Otolaryngol. Head Neck Surg., 155(2), pp. 274-280 (2016).
Li Wen-Fei, et al.: "Prognostic value of 1-15 plasma Epstein-Barr virus DNA level during posttreatment follow-up in the patients with nasopharyngeal carcinoma having undergone intensity-modulated radiotherapy", Chinese Journal of Cancer, vol. 36, No. 1, Dec. 1, 2017 (Dec. 1, 2017), p. 87.
Shah S. H, et al., "Association of Epstein Barr Virus (EBV) with nasopharyngeal carcinoma (NPC)", Pakistan Medical Association. Journal., vol. 50, No. 6, Jan. 1, 2000 (Jan. 1, 2000), pp. 182-183.
Ozkan et al., "Seropositivity of Epstein-Barr virus in Eastern Anatolian Region of Turkey," Asian Pac. *J. Allergy Immunol.*, 21(1):49-53 (2003).
Cao et al., "The prevalence and prevention of nasopharyngeal carcinoma in China," *Chin. J. Cancer*, 30(2):114-119 (2011).
Long et al., "Cigarette smoking and the risk of nasopharyngeal carcinoma: a metaanalysis of epidemiological studies," *BMJ Open*, 7(10):e016582 (2017).

\* cited by examiner

METHODS FOR ANALYZING VIRAL NUCLEIC ACID

CROSS-REFERENCE

This application claims priority to U.S. provisional application No. 62/617,079, filed Jan. 12, 2018, and U.S. provisional application No. 62/718,290, filed Aug. 13, 2018, which are herein incorporated by reference in their entireties.

BACKGROUND

Nasopharyngeal carcinoma (NPC) is one of the commonest cancers in Southern China and Southeast Asia (Tang et al. Cancer Lett 2016; 374:22-30). The pathogenesis of NPC can be closely associated with Epstein-Barr virus (EBV) infection. In endemic areas, the EBV genome can be detected in NPC cancer cells in almost all patients. Circulating cell-free EBV DNA in plasma can be a biomarker for NPC (Lo et al. Cancer Res 1999; 59:1188-91). Plasma EBV DNA analysis can be useful for the detection, monitoring and prognostication of NPC.

However, the amount of EBV cell-free DNA (cfDNA) in a sample can change depending on various subject-dependent (e.g., current smoking habit) and subject-independent factors (e.g., ambient temperature). There is a need for improved methods, systems, and computer readable medium that can account for factors that influence EBV cfDNA levels, and can incorporate this information in screening for presence of NPC in order to reduce false positive rates of NPC detection.

SUMMARY

Disclosed herein are methods of screening for presence of a tumor in a subject, the methods comprising: a) determining an amount of cell-free nucleic acid from a virus in a biological sample from the subject; b) determining a threshold of cell-free nucleic acid based on an attribute selected from the group consisting of: age of the subject, smoking status of the subject, and ambient temperature; and c) comparing the amount of cell-free nucleic acid from the virus to the threshold, thereby screening the subject for the tumor.

The threshold can be determined based on the smoking status of the subject. If the smoking status of the subject is smoker, the threshold can be set higher than if the smoking status of the subject is not a smoker. The threshold can be determined based on the age of the subject. The threshold can comprise a positive correlation with subject age. The threshold can be determined based on the ambient temperature. The threshold can be negatively correlated with ambient temperature. The ambient temperature can be a temperature measured at a location within 50 km of a location at which the sample was acquired from the subject. The ambient temperature can be a mean ambient temperature on a day the sample was acquired from the subject. The threshold can be determined based on the age of the subject and the smoking status of the subject. The threshold can be determined based on the age of the subject and the ambient temperature. The threshold can be determined based on the smoking status of the subject and the ambient temperature. The threshold can be determined based on the age of the subject, the smoking status of the subject, and the ambient temperature. In some embodiments, the threshold is not determined based on whether the subject has diabetes, consumes alcohol, exercises, has hypertension, has hyperlipidemia, or has ischemic heart disease.

Comparing the amount of cell-free nucleic acid from the virus to the threshold based on the attribute can reduce a false positive rate of the screen relative to comparing the amount of cell-free nucleic acid to a threshold not based on the attribute. The amount can comprise a number of copies of cell-free nucleic acid from the virus per milliliter (copies/mL). The methods can further comprise performing a second screen for presence of the tumor if the amount of cell-free nucleic acid from the virus in the biological sample is above the threshold. The second screen can comprise determining a size of cell-free nucleic acid from the virus in a second biological sample. The second biological sample can be identical to the biological sample. The second biological sample can be different from the biological sample. The second screen can comprise determining an amount of cell-free nucleic acid from the second biological sample from the subject that is from the virus and has a size within a given range. Determining the amount of the cell-free nucleic acid that is from the virus and has a size within a given range can comprise massively parallel sequencing of the cell-free nucleic acid in the second biological sample to generate sequence reads.

The biological sample can comprise plasma or serum. Determining the amount can comprise amplification of the cell-free nucleic acid. The amplification can comprise polymerase chain reaction (PCR). The PCR can comprise quantitative PCR (qPCR). The tumor can be nasopharyngeal cancer. The virus can be an Epstein-Barr Virus (EBV). The method can further comprise treating the subject for the tumor when the screen indicates the tumor is present in the subject.

Further disclosed herein are computer products comprising a computer readable medium storing a plurality of instructions for controlling a computer system to perform operations of any of the method described herein.

Additionally, further disclosed herein are systems comprising any of the computer products described herein and one or more processors for executing instructions stored on the computer readable medium.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Overview

Disclosed herein are methods, systems, and computer readable medium for screening for presence of a tumor, e.g., nasopharyngeal cancer, comprising determining an amount of cell-free nucleic acid, e.g., DNA, from a virus, e.g., Epstein Barr virus (EBV) in a biological sample, e.g., plasma, from a subject, determining a threshold of cell-free nucleic acid based on an attribute selected from the group consisting of age of the subject, smoking status of the subject, and ambient temperature; and comparing the amount of cell-free nucleic acid from the virus to the threshold, thereby screening the subject for the tumor.

The methods described herein can determine or adjust the threshold of cell-free nucleic acid based on one or more attributes. Determining or adjusting the threshold based on one or more attributes, also referred to herein as features, can reduce a false positive rate of the screen relative to not determining or adjusting the threshold based on the one or more attributes. A false positive can refer to a subject that does not have a condition (e.g., the tumor), but is identified as having the condition by a screen or method of the present disclosure or another assay.

Determining a Threshold

In the methods, systems, and computer readable medium provided herein, the threshold can be an amount of cell-free nucleic acid of viral origin indicative of a tumor or risk of the tumor in the subject. The threshold can be determined, in part, as described in PCT publication no. WO2018081130 or U.S. Patent Application Publication No. 20180237863, which are herein incorporated by reference. The threshold can be determined by analyzing a training set including a set of biological samples from one or more subjects known to have a tumor, e.g., nasopharyngeal cancer, and a set of biological samples from one or more subjects known not to have a tumor, e.g., nasopharyngeal cancer. The threshold can be set so that 100%, at least 99%, at least 95%, at least 90%, at least 85%, at least 80%, at least 75%, at least 70%, at least 65%, at least 60%, at least 55%, or at least 50% of biological samples from subjects known to have the tumor, e.g., nasopharyngeal cancer, have an amount of cell-free nucleic acid of viral (e.g., EBV) origin above the threshold. A baseline threshold can be established, and the baseline threshold can be adjusted based on an attribute selected from the group consisting of age of the subject, smoking status of the subject, and ambient temperature.

The threshold can be an amount of cell-free nucleic acid. The amount of cell-free nucleic acid can be an amount of nucleic acid (e.g., viral nucleic acid, EBV nucleic acid) described in U.S. Patent Application Publication No. 20180237863. For example, the threshold can be an amount of plasma EBV DNA, such as plasma EBV DNA concentration. The amount can be determined from the sample. The cell-free nucleic acid can be cell-free nucleic acid of viral origin. The amount of cell-free nucleic acid of viral origin can indicate a viral load of the sample. The amount of cell-free nucleic acid of viral origin can be indicative of a tumor or risk of the tumor in the subject. The amount of cell-free nucleic acid of viral origin can be an amount indicating a presence of a tumor.

The amount can be a number of copies of cell-free nucleic acid of viral origin per volume (e.g., milliliter (copies/mL)), a number of copies of a specific sequence of cell-free nucleic acid of viral origin per volume (e.g., milliliter), a proportion of total cell-free nucleic acid of viral origin to total cell-free nucleic acid of non-viral origin, or a proportion of a specific sequence of cell-free nucleic acid of viral origin to total cell-free nucleic acid of non-viral origin. The amount of cell-free nucleic acid can be a quantity, mass (e.g., grams, nanograms), number of molecules (e.g., 1, 2, 3, 4), level, normalized amount, concentration (e.g., copies/mL), percentage, or ratio of cell-free nucleic acid. The amount of cell-free nucleic acid can be, e.g., a ratio of viral cell-free nucleic acid to non-viral cell-free nucleic acid in the sample, a ratio of viral cell-free nucleic acid in a certain size range to non-viral cell-free nucleic acid of the same or different size ratio in the sample. Examples of size ratios can be found, e.g., in U.S. Patent Application Publication No. 20180237863.

The amount can be a proportion of cell-free nucleic acid of viral origin in the sample. The proportion of cell-free nucleic acid of viral origin can be a proportion of the cfDNA of viral origin in a size range. The proportion can be used to determine a size ratio of cell-free nucleic acid. The size ratio can be a proportion of cell-free nucleic acid of viral origin within a size range to a proportion of autosomal cell-free nucleic acid within the size range. In one example, an EBV DNA size ratio is the proportion of EBV DNA with a size of 80-110 bp to the proportion of autosomal cell-free DNA with a size of 80-110 bp. In another example, an EBV DNA size ratio is the proportion of EBV DNA less than 180 bp to the proportion of autosomal cell-free DNA less than 180 bp. In one example, an EBV DNA size ratio is the proportion of EBV DNA less than 150 bp to the proportion of autosomal cell-free DNA less than 150 bp.

The specific sequence of viral origin can be a sequence encoding latent membrane protein (LMP), an Epstein-Barr virus nuclear antigen (EBNA), an Epstein-Barr virus encoded small RNA (EBER), an EBV polymerase (Pol), an EBV polymerase accessory protein; a BamHI fragment, or a combination thereof.

The threshold can be about 1 copy/mL, 5 copies/mL, 10 copies/mL, 50 copies/mL, 100 copies/mL, 200 copies/mL, 300 copies/mL, 500 copies/mL, 1000 copies/mL, 10,000 copies/mL, or 100,000 copies/mL. The threshold can be from 0 to 4000 copies/mL. The threshold can be at least 50 copies/mL. The threshold can be from 50 to 500 copies/mL. The threshold can be from 100 to 500 copies/mL. The threshold can be from 200 to 500 copies/mL. The threshold can be from 50 to 200 copies/mL. The threshold can be up to 500 copies/mL. Alternatively, the threshold can be from 20,000 to 50,000 copies/mL.

In some cases, the threshold can be an adjusted baseline, or initial threshold, wherein a predetermined baseline threshold is adjusted based on one or more subject-dependent or subject-independent attributes. In one example, a baseline threshold is adjusted based on the subject's age, the subject's smoking status, the temperature at which the sample was collected, or a combination thereof. In some cases, a threshold can be determined based on at least one subject-dependent or subject-independent attribute, for example using an algorithm.

The attribute can be a subject-dependent attribute or a subject-independent attribute. Examples of subject-dependent attributes include age, current smoking status, current drinking status, exercise habit, and comorbidity status. An example of a subject-independent attribute includes ambient temperature.

In some cases, the threshold is determined based on the age of the subject. In some cases, the threshold of plasma EBV DNA concentration is determined based on the age of the subject. For example, a lower cutoff (threshold) can be used for a younger person than for an older person. In another example, a higher cutoff (threshold) can be used for an older person than for a younger person. The age of the subject can be the age of the subject at the time the biological sample was collected. The age of the subject can be, e.g., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 95, 96, 97, 98, 99, 100, 101, 102, 103, 104, 105, 1060, 107, 108, 109, 110, 111, 112, 113, 114, 115, 116, 117, 118, 119, or 120 years old. The age of the subject can be 12 years old or younger, 13 years old to 19 years old, 20 years old to 35 years old, 36 years old to 45 years old, 46 years old to 59 years old, 60 years old to 79 years old, or over 80 years old. The threshold can comprise a positive correction with age (see e.g., FIG. 1). In some cases, an older subject (e.g., an older subject without NPC) can have a higher amount of cfDNA from EBV in a biological sample than a younger subject (e.g., a younger subject without NPC). For example, a 5-year increase in age can be associated with a 0.6% increase in the positive rate of plasma EBV DNA among subjects without NPC (see e.g., FIG. 1). In some cases, the age of the subject is compared to a baseline age. The baseline age can be a pre-determined age from which any subsequent adjustments are made. In some cases, if the subject's age is above the baseline age, the threshold is raised by at least about 1%, 2%, 3%, 4%, 5%, or 10% for each year the subject is above the baseline age. In some cases, if the subject's age is below the baseline age, the threshold is lowered by at least about 1%, 2%, 3%, 4%, 5%, or 10% for each year the subject is below the baseline age. In some cases, if the subject's age is above the baseline age, the threshold is raised by at least about 1%, 2%, 3%, 4%, 5%, or 10% for each block of 5 or 10 years the subject is above the baseline age. For example, if the baseline age is 50, the subject's age is 62, and the threshold is raised by 2% for every 5 years, the threshold for the subject can be raised by 6% compared to the threshold at age 50. In some cases, if the subject's age is below the baseline age, the threshold is lowered by at least about 1%, 2%, 3%, 4%, 5%, or 10% for each block of 5 or 10 years the subject is below the baseline age.

In some cases, the threshold is determined based on the smoking status of the subject. In some cases, the threshold of plasma EBV DNA concentration is determined based on the smoking status of the subject. The smoking status of the subject can be smoker or non-smoker. If the subject is a smoker, the threshold can be set higher than if the subject is not a smoker. In some cases, smoking status indicates whether a subject is a current smoker or not a current smoker. A current smoker can be a subject who has participated in smoking (e.g., smoked at least one, 10, or 100 cigarettes) within the past day, week, month, or year. The smoking can be smoking of any tobacco or marijuana product. The tobacco or marijuana product can be, e.g., a cigar, blunt, cigarillo, little cigar, cigarette, or kretek. The smoking can be facilitated by a handheld electronic device, such as an electronic cigarette. The electronic device can produce an aerosol, or vapor, comprising nicotine. In some cases, a current or former smoker smokes/smoked, on average, about 1, about 5, about 10, about 15, about 20, about 25, about 30, about 35, about 40, about 45, about 50, about 55, about 60, about 65, about 70, or about 75 cigarettes a day. In some cases, the current smoker/former smoker smokes/smoked about 1 to about 10, about 10 to about 20, about 20 to about 30, about 30 to about 40, about 40 to about 50, about 50 to about 60, or about 60 to about 75 cigarettes a day. In some cases, the current or former smoker smokes/smoked more than 75 cigarettes a day. In some cases, if the subject is a smoker, the threshold is raised by at least about 1%, 2%, 5%, 10%, 20%, or 25%. In some cases, if the subject is a non-smoker, the threshold is lowered by at least about 1%, 2%, 5%, 10%, 20%, or 25%. A non-smoker can be a subject who has not participated in smoking (e.g., smoked at least one, 10, or 100 cigarettes) within the past day, week, month, or year.

In some cases, the threshold is determined based on an ambient temperature. In some cases, the threshold of plasma EBV DNA concentration is determined based on the ambient temperature. For example, a higher threshold can be used for samples collected on colder days than the threshold used for samples collected on warmer days. In another example, a lower threshold can be used for samples collected on warmer days than the threshold used for samples collected on colder days. The ambient temperature can be a temperature at the time the biological sample was taken from the subject. The ambient temperature can be determined at a location at or near where the sample was collected. A location near where the sample was collected can be a location within 1 kilometer (km), 10 km, 100 km, 200 km, 300 km, 400 km, or 500 km of the location where the sample was taken. The ambient temperature can be the temperature of the environment, at or near the location where the sample was taken, on the day the sample was collected. The ambient temperature can be a mean ambient temperature. The mean ambient temperature can be the mean ambient temperature on the day the sample was collected, a mean ambient temperature over the 24 hours immediately prior to the time the sample was collected, or a mean ambient temperature in the week immediately prior to the time the sample was collected. The ambient temperature can be the high or low temperature at the location at or near where the sample was collected on the day the sample was collected. The ambient temperature can be the temperature at the location at or near where the sample was collected on the day the sample was collected at a particular time of the day (e.g., morning, noon, afternoon, evening). The ambient temperature can be determined at an official weather observatory in the municipality or country in which the sample is taken. The ambient temperature can be determined by the U.S. National Weather Service or the Hong Kong Observatory. The ambient temperature can be determined using an analog or digital thermometer.

Figure 2:
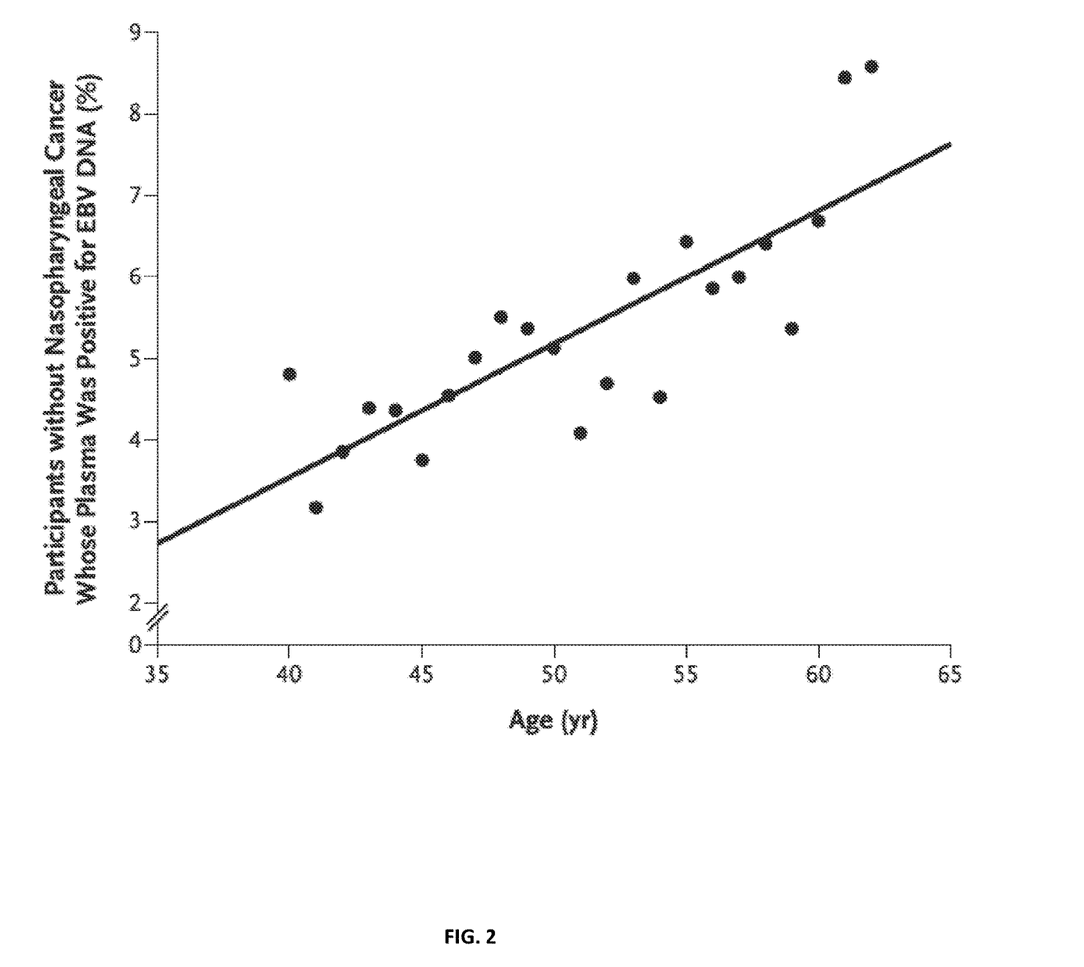
FIG. 2 illustrates the correlation between mean ambient temperature on the day of screening and detectability of plasma EBV DNA in non-NPC subjects.

The threshold can comprise a negative correlation with ambient temperature (see e.g., FIG. 2). In some cases, the ambient temperature is compared to a baseline temperature. The baseline temperature can be a pre-determined temperature from which any subsequent adjustments are made. In some cases, if the ambient temperature is above the baseline temperature, the threshold is lowered by at least about 1%, 2%, 3%, 4%, 5%, 6%, 7%, 8%, 9%, or 10% for each degree (Celsius) the ambient temperature is above the baseline temperature. In some cases, if the ambient temperature is below the baseline temperature, the threshold is raised by at least about 1%, 2%, 3%, 4%, 5%, 6%, 7%, 8%, 9%, or 10% for each degree (Celsius) the ambient temperature is above the baseline temperature. In some cases, if the ambient temperature is below the baseline temperature, the threshold is raised by at least about 1%, 2%, 3%, 4%, 5%, 6%, 7%, 8%, 9%, or 10% for each block of 2, 3, 4, or 5 degrees the ambient temperature is above the baseline temperature. For example, if the baseline temperature is 24° C., the mean ambient temperature on the day a sample is taken from the subject was 19° C., and the threshold can be lowered by 1% for every 3 degrees, the threshold for the subject can be lowered by 2% compared to the threshold at temperature 24° C. In some cases, if the ambient temperature is above the baseline temperature, the threshold can be raised by at least about 1%, 2%, 3%, 4%, 5%, 6%, 7%, 8%, 9%, or 10% for each block of 2, 3, 4, or 5 degrees the temperature is above the baseline temperature.

In some instances, the threshold is determined based on the age of the subject and the smoking status of the subject. In some instances, the threshold is determined based on the age of the subject and the ambient temperature. In some instances, the threshold is determined based on the smoking status of the subject and the ambient temperature. In some instances, the threshold is determined based on the age of the subject, the smoking status of the subject, and the ambient temperature.

In some cases, the threshold is not determined based on the comorbidity status of the subject, the current drinking status of the subject, the exercise habit of the subject, or any combination thereof.

In some cases, the current drinking status of the subject indicates whether the subject is a current drinker of alcohol or not a current drinker of alcohol. A current drinker can be a subject who has participated in drinking alcohol (e.g., consumed alcohol) within the past day, week, month, or year.

In some cases, the exercise habit of a subject indicates whether a subject is a regular participant in exercise. A regular participant in exercise can be a subject engaging in at least 15 minutes (min), 30 min, 45 min, or 60 min of moderate exercise on at least one, two, or three days per week. In some instances, a regular participant in exercise can a subject engaging in at least 30 minutes of moderate exercise on at least two days per week.

In some cases, the comorbidity status of the subject is the presence or absence of one or more comorbidities in the subject. The one or more comorbidities can include diabetes mellitus, hypertension, hyperlipidemia, ischemic heart disease, or a combination thereof.

The methods of screening for presence of a tumor provided herein can further comprise comparing the amount of cell-free nucleic acid from the virus to the threshold. Comparing the amount of cell-free nucleic acid from the virus to the threshold can be used to screen the subject for the tumor.

Figure 4:
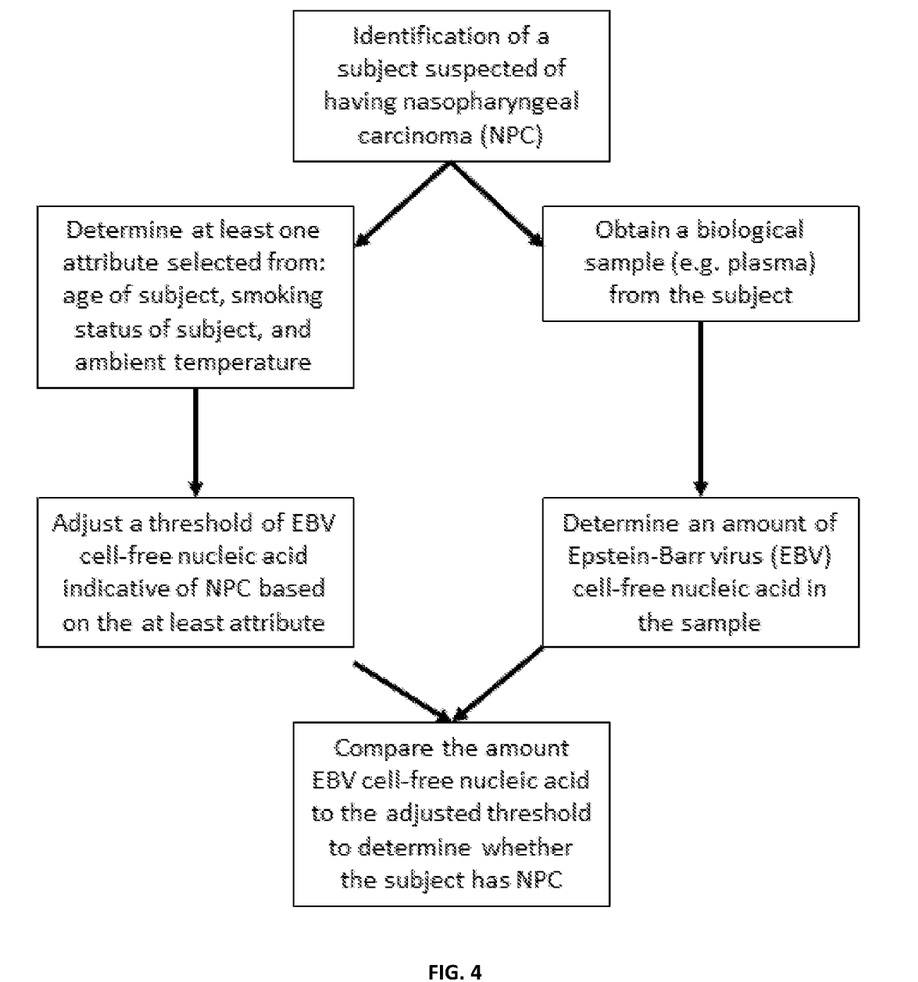
FIG. 4 illustrates a flow chart of a method to detect NPC based on levels of EBV cell free nucleic acid detected from a sample.

The determined threshold, e.g., a threshold determined using a training set, can be compared to an amount of cell-free nucleic acid of viral original from one or more biological samples from one or more subjects that have an unknown tumor status. In one example, if a subject has an amount of EBV plasma cfDNA above a threshold, then that subject is determined to have or be at risk of having NPC. In another example, if a subject has an amount of EBV plasma cfDNA below a threshold, then that subject is determined to not have or be at risk of having NPC. An exemplary workflow for comparing a detected amount of EBV cell-free nucleic acid to a threshold to determine whether a subject has NPC is illustrated in FIG. 4.

Determining Amounts of Cell-Free Nucleic Acid From a Virus

The amount of cell-free nucleic acid from a virus can be determined, e.g., as described in U.S. Patent Application Publication No. 20180237863. In some cases, determining an amount of cell-free nucleic acid from a virus comprises amplifying the cell-free nucleic acid from the virus. The amplifying can comprise polymerase chain reaction (PCR), such as quantitative PCR (qPCR, also referred to as real-time PCR). The amplification can comprise reverse transcription-PCR, real-time PCR, quantitative real-time PCR, digital PCR (dPCR), digital emulsion PCR (dePCR), clonal PCR, amplified fragment length polymorphism PCR (AFLP PCR), allele specific PCR, assembly PCR, asymmetric PCR (in which a great excess of primers for a chosen strand can be used), strand displacement amplification, multiple displacement amplification, rolling circle amplification, colony PCR, helicase-dependent amplification (HDA), Hot Start PCR, ligase chain reaction, inverse PCR (IPCR), in situ PCR, long PCR (extension of DNA greater than about 5 kilobases), helicase dependent amplification, ramification amplification method, multiplex PCR, nested PCR (uses more than one pair of primers), single-cell PCR, touchdown PCR, loop-mediated isothermal PCR (LAMP), recombinase polymerase amplification (RPA), or nucleic acid sequence based amplification (NASBA). The amplifying can comprise whole genome amplification or targeted amplification. In some cases, prior to the amplifying, the cell-free nucleic acid is isolated from the biological sample. Cell-free nucleic acid can be isolated from the biological sample by selecting cell-free nucleic acid fragments of a given size. Cell-free nucleic acid shorter than 150 base pairs (bp), 200 bp, or 300 bp in length can be isolated from the biological sample. In some cases, cell-free nucleic acid from 150 bp to 300 bp is isolated. In some cases, cell-free nucleic acid from 150 bp to 200 bp is isolated. In some cases, cell-free nucleic acid from 180 bp to 200 bp is isolated. In some cases, cell-free nucleic acid from 80 bp to 110 bp is isolated.

The amount of cell-free nucleic acid from a virus can be determined by, e.g., spectrophotometry (e.g., UV spectrophotometry, e.g., NANODROP), fluorometry (e.g., using QUANTIFLUOR dye), microarray (e.g., DNA microarray), mass-spectrometry, sequencing, e.g., next-generation sequencing. The sequencing can comprise chain termination sequencing, hybridization sequencing, 454 sequence (ROCHE), sequencing using reversible terminator dyes (IL-LUMINA sequencing), semiconductor sequencing (THERMOFISHER ION TORRENT), mass spectrophotometry sequencing, massively parallel signature sequencing (MPSS), Maxam-Gilbert sequencing, nanopore sequencing (e.g., using technology from OXFORD NANOPORE or GENIA), single molecule electronic detection sequencing (e.g., measuring tunnel current through nano-electrodes as nucleic acid (DNA/RNA) passes through nanogaps and calculating the current difference; e.g., using QUANTUM SEQUENCING from QUANTUM BIOSYSTEMS), microdroplet single molecule sequence e.g., using pyrophosphorolysis (e.g., using technology from BASE4), polony sequencing, pyrosequencing, shotgun sequencing, single molecule real time (SMRT) sequencing (PACIFIC BIOSCIENCES), GenapSys Gene Electronic Nano-Integrated Ultra- Sensitive (GENIUS) technology from GENAPSYS, GENEREADER from QIAGEN, or SOLiD sequencing, The method can comprise enrichment of cell-free nucleic acid from a virus from the sample prior to sequencing. Enrichment can comprise the use of hybridization probes to capture the cell-free nucleic acid from a virus. In some cases, the method does not require enrichment of of cell-free nucleic acid from a virus from the sample prior to sequencing. The method can comprise assembling a sequencing library. For example, a sequencing library can be constructed as previously described (see e.g., Lam et al. Proc Natl Acad Sci USA. 2018 May 29; 115(22): E5115-E5124).

The one or more targets can be enriched, e.g., using SEQCAP from ROCHE. Nucleic acid, e.g., DNA, e.g., genomic DNA, can be fragmented, e.g., by sonication. The fragmented DNA can be annealed to capture probes. The capture probes can be labeled. The probes can be bound to solid supports, e.g., magnetic beads coated with streptavidin. The captured targets can be released, amplified, and sequenced.

The one or more targets can be enriched, e.g., using HALOPLEX Target Enrichment System from AGILIENT TECHNOLOGIES. Nucleic acid, e.g., DNA, e.g., genomic DNA, can be fragmented, e.g., by restriction enzyme digestion. A probe in the presence of an indexing primer cassette can be used to generate a DNA fragment that is circularized and has one or more indexes incorporated and optionally has one or more sequencing motifs useful for a sequencing platform, e.g., ILLUMINA sequencing. The probe can comprise a label, e.g., biotin, that can be added, e.g., by biotinylation. The label probe can be captured, e.g., using a streptavidin-coated bead (e.g., a magnetic bead). Captured targets can be amplified, e.g., by PCR, and analyzed, e.g., by sequencing, e.g., next-generation sequencing.

The one or more targets can be enriched using one or more capture probes, e.g., using SURESELECT Target Enrichment from AGILENT TECHNOLOGIES. Nucleic acid, e.g., DNA, e.g., genomic DNA, can be fragmented, e.g., by sonication. The one or more targets can be enriched using one or more probes, e.g., one or more cRNA probes, of about 10 to about 200 bases, about 20 to about 175 bases, about 25 to about 150 bases, or about 120 bases. The one or more probes, e.g., one or more cRNA probes, can be labeled with a label, e.g., biotin, and the label can be bound to a solid support, e.g., a bead (e.g., a magnetic bead), e.g., through a binding moiety, e.g., streptavidin. The solid support, e.g., beads, e.g., magnetic beads, can be captured, e.g., using a magnet. The one or more captured targets can be unbound from the solid support (e.g., by digesting the cRNA probes) amplified, e.g., by PCR, and analyzed, e.g., by sequencing, e.g., next-generation sequencing.

The one or more targets can be enriched, e.g., using a transposase, e.g., using NEXTERA tagmentation. The one or more targets can be enriched by addition of adaptors through transposition and then amplifying using primers that anneal to the adaptors by PCR.

The one or more targets can be enriched using Single Primer Enrichment Technology (SPET) from NUGEN. Adaptors can be attached to nucleic acid fragments. Primers comprising 3' adaptors can be annealed to target sequence and extended. The extended products can be amplified using primers to adaptor sequences and the amplified products can be analyzed by sequencing, e.g., next-generation sequencing.

The determining an amount of cell-free nucleic acid from the virus can comprise determining a number of copies of the cell-free nucleic acid from the virus. For example, the number of copies of a specific viral cell-free nucleic acid, e.g., cfDNA, sequence per volume (e.g., mL) of biological sample can be determined. The determining an amount of cell-free nucleic acid from the virus can comprise determining the number of copies of the viral (e.g., EBV) genome per volume (e.g., milliliter) of biological sample (e.g., plasma).

Determining an amount of cell-free nucleic acid from the virus can comprise amplifying at least one viral sequence. The viral sequence can be derived from an Epstein-Barr virus (EBV). An EBV sequence can be a sequence encoding a latent membrane protein (LMP), an Epstein-Barr virus nuclear antigen (EBNA), an Epstein-Barr virus encoded small RNA (EBER), an EBV polymerase (Pol), an EBV polymerase accessory protein (e.g. BMRF1), a BamHI fragment, or a combination thereof. Examples of LMP include LMP-1, LMP-2A, and LMP-2B. Examples of EBNA include EBNA-1, EBNA-2, EBNA-3a, EBNA-3b, and EBNA-3c. Examples of EBER include EBER-1 and EBER-2. Examples of BamHI fragments include BamHI-A, BamHI-C, and BamHI-W. In some cases, determining an amount of cell-free nucleic acid from the viruses comprises determining the amount of one, two, three, four, five, or more than five viral sequences.

In some cases, determining an amount of cell-free nucleic acid comprises sequencing the cell-free nucleic acid from the virus. The sequencing can generate sequence reads. Alignment of the sequence reads to a human genome or the viral genome can distinguish sequences originating from a human genome (e.g., genome of the subject) and sequences originating from a non-human genome (e.g., genome of the virus). The sequencing can comprise whole genome sequencing or targeted sequencing. The targeted sequencing can comprise amplifying at least one viral sequence, e.g., as described herein. The sequencing can be massively parallel sequencing. The sequencing can comprise sequencing clonally expanded or non-amplified single molecules of nucleic acid fragments. The sequencing can comprise chain termination sequencing, hybridization sequencing, Illumina® sequencing (e.g., using reversible terminating dyes), Ion Torrent™ (e.g., semiconductor) sequencing, mass spectrophotometry sequencing, massively parallel signature sequencing (MPSS), Maxam-Gilbert sequencing, nanopore sequencing, polony sequencing, pyrosequencing, shotgun sequencing, single molecule real time (SMRT) sequencing, SOLiD® sequencing (e.g., using fluorescently labeled di-base probes), universal sequencing, or any combination thereof. In some embodiments, amplification can comprise digital PCR. The sequencing can be done using the Illumina® NextSeq 500 platform or the NextSeq 550 platform.

Viruses and Tumors

The virus can be a virus associated with cancer. Non-limiting examples of viruses that can cause, or be associated with, cancer in a subject include human papillomavirus (HPV), Epstein-Barr virus (EBV), hepatitis B virus (HBV), hepatitis C virus (HCV), human immunodeficiency virus (e.g., associated with Kaposi sarcoma, cervical cancer, non-Hodgkin lymphoma, anal cancer, Hodgkin disease, lung cancer, oral cancer, oropharyngeal cancer, skin cancer, and liver cancer), human herpes virus 8 (e.g., associated with Kaposi sarcoma, blood cancer, primary effusion lymphoma, and Castleman disease), human T-lymphotrophic virus-1 (e.g., associated with lymphocytic leukemia, non-Hodgkin lymphoma, and adult T-cell leukemia/lymphoma), and Merkel cell polyomavirus (e.g., associated with skin cancers such as Merkel cell carcinoma). The virus can be an Epstein-Barr virus (EBV). The tumor can be a tumor caused by the virus or associated with the virus. The tumor can be a tumor caused by or associated with the Epstein-Barr virus. Examples of tumors caused by or associated with EBV include nasopharyngeal carcinoma, lymphoma (e.g., Burkitt lymphoma or Hodgkin lymphoma), and stomach cancer. In some case, the tumor is a nasopharyngeal carcinoma (NPC).

Biological Samples and Nucleic Acid

The biological sample can be whole blood, plasma, serum, urine, pleural fluid, or lymph fluid. In some cases, the biological sample is plasma. The biological sample can comprise peripheral blood lymphocytes (PBLs), peripheral blood mononuclear cells (PBMCs). The biological sample can comprise cell-free nucleic acid, which can be any nucleic acid found in a biological sample not contained within an intact cell. The cell-free nucleic acid can be cell-free DNA (cfDNA) or cell-free RNA. The cell-free nucleic acid can be circulating nucleic acid, e.g., circulating DNA or RNA. At least a portion of the cell-free nucleic acid in the biological sample can be of viral origin, and/or can be from a tumor. Cell-free nucleic acid derived from a tumor that is found in the bloodstream can be referred to as circulating tumor nucleic acid, e.g., circulating tumor DNA (ctDNA). An example of cell-free nucleic acid can be plasma DNA. An example of cell-free nucleic acid derived from a virus can be plasma EBV DNA.

Subjects

The biological sample can be taken from a subject. The subject can be a human. Alternatively, the subject can be a non-human primate (e.g. a gorilla, a chimpanzee, a bonobo, an ape, an orangutan, a lemur, or a baboon), a dog, a cat, a goat, a guinea pig, a hamster, a mouse, a pig, a goat, a cow, a camel, or a zebrafish. The subject can be a subject being screened for a tumor. A sample can be obtained from a subject invasively (e.g., surgical means) or non-invasively (e.g., a blood draw, a swab, or collection of a discharged sample).

Additional Assays

Figure 5:
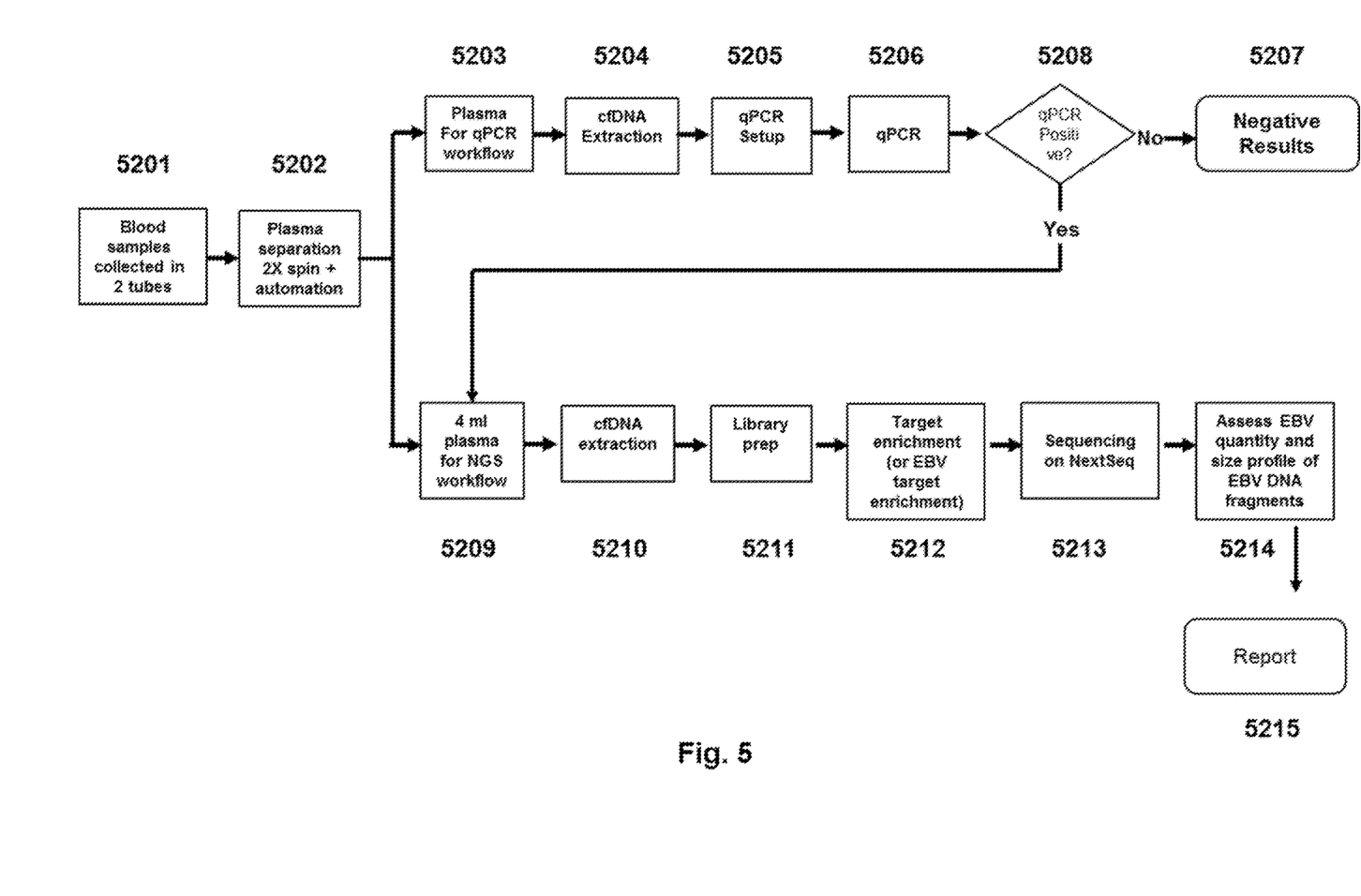
FIG. 5 depicts a flow chart of an exemplary method of the present disclosure comprising performing a first qPCR assay, and potentially performing a second next-generation sequencing (NGS)-based assay.

In some embodiments, methods of the present disclosure comprise performing two or more assays (e.g., a first assay and a second assay). The assay (e.g., first assay and/or second assay) can be an assay described in U.S. Patent Application Publication No. 20180237863 (see e.g., FIG. 5). For example, a blood sample can be obtained from a subject, and cells can be removed from plasma containing cell-free DNA (cfDNA), e.g., by performing centrifugation two times in series 5202. Centrifugation can be performed for 10 minutes at 2,000×g to deplete platelets and cells from the plasma sample. Approximately 0.8 milliliters of plasma from one of the two blood samples collected can be used for qPCR analysis to detect a copy number of tumor-derived DNA (EBV DNA) in the sample 5203. cfDNA extraction can be performed 5204 on the plasma sample to enrich the plasma sample for cfDNA, and prepare the sample for qPCR analysis. The denaturing, annealing, and extension temperatures for the qPCR analysis can be determined 5205 (e.g., based on the length/GC contents of the primers used, and/or the concentration of total cfDNA in the sample), and qPCR analysis can be performed 5206 to detect an amount of tumor-derived cfDNA in the sample. To detect EBV DNA, primers flanking the BamHI sequence of the genome can be used. A threshold can be established based on the age and/or smoking status of the subject and/or the ambient temperature at the time the sample was taken from the subject. If the amount of EBV DNA detected is below threshold 5207, a negative result can be provided and in some cases, a second assay is not performed. If the amount of cfDNA detected is at or above threshold 5208, a second assay can be performed using the plasma from the second blood sample collected. For example, approximately 4 milliliters of plasma can be used for next generation sequencing 5209 to determine a size profile of the cfDNA in the sample. cfDNA extraction can be performed 5210 on the second plasma sample to enrich the plasma sample for cfDNA, and prepare the sample for next-generation sequencing analysis. Library preparation can be performed 5211 to ligate adapter oligonucleotides to the cfDNA fragments in the sample to be sequenced. cf DNA can be fragmented to an optimal length for the downstream platform. In some cases, DNA fragmentation does not result in homogeneous, blunt-ended fragments; end repair can be used to ensure that each molecule is free of overhangs, and contains 5' phosphate and 3' hydroxyl groups. Incorporation of a non-templated deoxyadenosine 5'-monophosphate (dAMP) onto the 3' end of blunted DNA fragments, a process known as dA-tailing, can be performed. Targeted enrichment of EBV DNA can be performed 5212; targeted enrichment of EBV DNA can enable sequencing of specific regions of interest instead of the entire genome. Next generation sequencing can be performed on the enriched sample 5213. Sequence reads corresponding to the sequenced cfDNA in the enriched plasma sample can be obtained, and optionally aligned to a reference genome. An analysis can be performed, e.g., EBV quantity can be assessed and a size profile of EBV DNA fragments can be generated 5214. A report can be outputted indicating if the subject from which the sample was obtained has nasopharyngeal cancer 5215.

In one example, a first assay can be performed to set a baseline amount of nucleic acid of viral origin for a subject prior to administration of a therapy while a second assay can be performed on a sample from the same subject after administration of the therapy. In another example, a first assay can be a qualitative assay on a sample from a subject to determine whether the subject has cell-free nucleic acid from the virus while a second assay can be a quantitative assay on a sample from the same subject to determine whether the subject is false positive for the tumor being detected (e.g., the amount of cell-free nucleic acid is below a threshold, potentially after adjustment of the threshold given a subject-independent or subject-dependent attribute described herein). In yet another example, the first assay can be performed on a sample from the subject to determine whether the subject is false positive for the tumor being detected (e.g., the amount of cell-free nucleic acid is below a threshold, potentially after adjustment of the threshold given a subject-independent or subject-dependent attribute described herein) while the second assay can be performed on a sample from the subject to confirm the presence of the tumor.

In some cases, a first portion of the biological sample is used in a first assay and a second portion of the biological sample is used in the second assay. In other cases, the biological sample used in the first assay and a second biological sample is used in the second assay, wherein the second biological sample is collected at a different time point than the first biological sample from the same subject. The second biological sample can be collected at least 1 day, 2 days, 3 days, 4 days, 5 days, 6 days, 1 week, 2 weeks, 3 weeks, 1 month, 2 months, 3 months, 4 months, 5 months, 6 months, 1 year, 2 years, 3 years, 4 years, or 5 years after the first biological sample.

In some instances, the method further comprises performing a second screen for the tumor if the amount of cell-free nucleic acid indicates the subject has or is suspected of having the tumor. For example, the subject can be suspected of having the tumor if the amount of plasma EBV cfDNA is above the threshold. The second screen can be a second assay to determine the amount of cell-free nucleic acid from a virus in the sample, such as by amplifying the cell-free nucleic acid from the virus. The second screen can comprise performing an endoscopy, a nasoscopy, a biopsy, an x-ray, a computed tomograph (CT or CAT) scan, a magnetic resonance imaging (MRI), an ultrasound, a bone scan, a neurological test, a hearing test, a positron emission tomograph (PET) or PET-CT scan, or a combination thereof, on the subject. The second screen can confirm the presence or absence of the tumor in the subject.

Treating

In some instances, the methods provided herein further comprise treating the subject for the tumor when the screen, the second screen, or the combination thereof indicates the tumor is present in the subject. Treating the subject for the tumor can comprise administration of a therapy. The therapy can be chemotherapy, radiation therapy, surgery, a targeted therapy or a combination thereof. In some cases, brachytherapy is used to administer the radiation therapy. In some cases, the surgery is nasopharyngectomy. The targeted therapy can be a monoclonal antibody. The monoclonal antibody can be an antibody which targets Epidermal Growth Factor Receptor (EGFR). The monoclonal antibody can be bevacizumab, cetuximab, or nivolumab. The targeted therapy can be a checkpoint inhibitor, for example, an anti-PDL1 antibody or an anti-PD1 antibody.

In some instances, the methods provided herein further comprise administering a prophylactic therapy to the subject. In some instances, the methods provided herein further comprise placing the subject under additional surveillance for the tumor. The prophylactic therapy can be administered to the subject, or the subject can be placed under additional surveillance for the tumor, when the subject has a risk factor for the tumor, the screen indicates presence of EBV DNA above the threshold, and the second screen does not indicate the presence of the tumor. Risk factors for NPC can be Asian ancestry, alcohol consumption, smoking, existence of a relative that has had NPC, and a combination thereof. Additional surveillance for the tumor can comprise a second screen as described herein. The additional surveillance can be carried out on the subject once every five years, once every four years, once every three years, once every two years, once a year, twice a year, three times a year, four times a year, five times a year, or six times a year. The additional surveillance can be carried out in conjunction with the screening for presence of a tumor described herein.

Reducing False Positive Rates

The false positive rate of tumor detection can be decreased by adjusting the threshold level of cell-free nucleic acid of viral origin indicative of the tumor based on subject-dependent or subject-independent attributes, as described herein. In some cases, the tumor is a nasopharyngeal cancer, and the nasopharyngeal cancer can be screened based on presence of plasma EBV DNA above a threshold.

In some cases, not adjusting the threshold results in a false positive rate of about 5.5%. In some cases, not adjusting the threshold results in a false positive rate of greater than 5.5%.

In some cases, adjusting the threshold results in a false positive rate of about 0.5%, about 0.6%, about 0.7%, about 0.8%, about 0.9%, about 1.0%, about 1.1%, about 1.2%, about 1.3%, about 1.4%, about 1.5%, about 1.6%, about 1.7%, about 1.8%, about 1.9%, about 2.0%, about 2.1%, about 2.2%, about 2.3%, about 2.4%, about 2.5%, about 2.6%, about 2.7%, about 2.8%, about 2.9%, about 3.0%, about 3.1%, about 3.2%, about 3.3%, about 3.4%, about 3.5%, about 3.6%, about 3.7%, about 3.8%, about 3.9%, about 4.0%, about 4.1%, about 4.2%, about 4.3%, about 4.4%, about 4.5%, about 4.6%, about 4.7%, about 4.8%, about 4.9%, about 5.0%, about 5.1%, about 5.2%, about 5.3%, or about 5.4%. In some cases, adjusting the threshold results in a false positive rate of less than 0.5%, less than 0.6%, less than 0.7%, less than 0.8%, less than 0.9%, less than 1.0%, less than 1.1%, less than 1.2%, less than 1.3%, less than 1.4%, less than 1.5%, less than 1.6%, less than 1.7%, less than 1.8%, less than 1.9%, less than 2.0%, less than 2.1%, less than 2.2%, less than 2.3%, less than 2.4%, less than 2.5%, less than 2.6%, less than 2.7%, less than 2.8%, less than 2.9%, less than 3.0%, less than 3.1%, less than 3.2%, less than 3.3%, less than 3.4%, less than 3.5%, less than 3.6%, less than 3.7%, less than 3.8%, less than 3.9%, less than 4.0%, less than 4.1%, less than 4.2%, less than 4.3%, less than 4.4%, less than 4.5%, less than 4.6%, less than 4.7%, less than 4.8%, less than 4.9%, less than 5.0%, less than 5.1%, less than 5.2%, less than 5.3%, or less than 5.4%. In some cases, adjusting the threshold results in a false positive rate of less than 5.5%.

In some cases, adjusting the threshold results in a false positive rate of between about 0.5% and about 5.0%. In some cases, adjusting the threshold results in a false positive rate of between about 1.0% and about 5.0%. In some cases, adjusting the threshold results in a false positive rate of from about 1.5% to about 5.0%. In some cases, adjusting the threshold results in a false positive rate of from about 2.0% to about 5.0%. In some cases, adjusting the threshold results in a false positive rate of from about 2.5% to about 5.0%. In some cases, adjusting the threshold results in a false positive rate of from about 3.0% to about 5.0%. In some cases, adjusting the threshold results in a false positive rate of from about 3.5% to about 5.0%. In some cases, adjusting the threshold results in a false positive rate of from about 4.0% to about 5.0%. In some cases, adjusting the threshold results in a false positive rate of from about 4.5% to about 5.0%.

In some cases, adjusting the threshold results in a false positive rate of from about 0.5% to about 4.5%. In some cases, adjusting the threshold results in a false positive rate of from about 1.0% to about 4.5%. In some cases, adjusting the threshold results in a false positive rate of from about 1.5% to about 4.5%. In some cases, adjusting the threshold results in a false positive rate of from about 2.0% to about 4.5%. In some cases, adjusting the threshold results in a false positive rate of from about 2.5% to about 4.5%. In some cases, adjusting the threshold results in a false positive rate of from about 3.0% to about 4.5%. In some cases, adjusting the threshold results in a false positive rate of from about 3.5% to about 4.5%. In some cases, adjusting the threshold results in a false positive rate of from about 4.0% to about 4.5%.

In some cases, adjusting the threshold results in a false positive rate of from about 0.5% to about 4.0%. In some cases, adjusting the threshold results in a false positive rate of from about 1.0% to about 4.0%. In some cases, adjusting the threshold results in a false positive rate of from about 1.5% to about 4.0%. In some cases, adjusting the threshold results in a false positive rate of from about 2.0% to about 4.0%. In some cases, adjusting the threshold results in a false positive rate of from about 2.5% to about 4.0%. In some cases, adjusting the threshold results in a false positive rate of from about 3.0% to about 4.0%. In some cases, adjusting the threshold results in a false positive rate of from about 3.5% to about 4.0%.

In some cases, adjusting the threshold results in a false positive rate of from about 0.5% to about 3.5%. In some cases, adjusting the threshold results in a false positive rate of from about 1.0% to about 3.5%. In some cases, adjusting the threshold results in a false positive rate of from about 1.5% to about 3.5%. In some cases, adjusting the threshold results in a false positive rate of from about 2.0% to about 3.5%. In some cases, adjusting the threshold results in a false positive rate of from about 2.5% to about 3.5%. In some cases, adjusting the threshold results in a false positive rate of from about 3.0% to about 3.5%.

In some cases, adjusting the threshold results in a false positive rate of from about 0.5% to about 3.0%. In some cases, adjusting the threshold results in a false positive rate of from about 1.0% to about 3.0%. In some cases, adjusting the threshold results in a false positive rate of from about 1.5% to about 3.0%. In some cases, adjusting the threshold results in a false positive rate of from about 2.0% to about 3.0%. In some cases, adjusting the threshold results in a false positive rate of from about 2.5% to about 3.0%.

In some cases, adjusting the threshold results in a false positive rate of from about 0.5% to about 2.5%. In some cases, adjusting the threshold results in a false positive rate of from about 1.0% to about 2.5%. In some cases, adjusting the threshold results in a false positive rate of from about 1.5% to about 2.5%. In some cases, adjusting the threshold results in a false positive rate of from about 2.0% to about 2.5%.

In some cases, adjusting the threshold results in a false positive rate of from about 0.5% to about 2.0%. In some cases, adjusting the threshold results in a false positive rate of from about 1.0% to about 2.0%. In some cases, adjusting the threshold results in a false positive rate of from about 1.5% to about 2.0%. In some cases, adjusting the threshold results in a false positive rate of from about 0.5% to about 1.5%. In some cases, adjusting the threshold results in a false positive rate of from about 1.0% to about 1.5%. In some cases, adjusting the threshold results in a false positive rate of from about 0.5% to about 1.0%. In some cases, adjusting the threshold results in a false positive rate of from about 3.8% to about 4.5%.

In one example, adjusting the threshold level of cell-free nucleic acid of viral origin indicative of the tumor based on ambient temperature can result in a false positive rate of about 4.5%. A false positive rate of about 4.5% can be achieved when samples are collected on days with a temperature of over 30° C. In another example, adjusting the threshold level of cell-free nucleic acid of viral origin indicative of the tumor based on age can result in a false positive rate of about 3.8%. A false positive rate of about 3.8% can be achieved when samples are collected from subjects less than or equal to 45 years of age.

Different strategies can be used to reduce the false-positive rate of plasma EBV DNA screening. Screening sessions can be scheduled in days with higher temperature, for example, in the summer. Adjustment of the fees for the analysis can be made according to the difference in the predicted false-positive rate due to ambient temperature. One implementation can be to charge lower testing fees in the winter and higher testing fees in the summer because of the higher false-positive rate in winter, to account for lower demand in the winter for a less accurate test. An alternate implementation can be to charge higher testing fees in the winter and lower testing fees in the summer, to encourage more people to be screened in the summer to enhance the overall accuracy of the test. The subjects who opt for screening can be advised to keep warm or to avoid exposure to cold temperature for a few days before receiving the screening test. The adjustment can be made, for example, to the time of the year or month, or the actual temperature of the day or week when the testing is carried out. The arrangement can also be adjusted due to the geographical location of the place of testing, for example, charging a lower testing fee in regions close to the equator. A quantitative threshold can be applied to the level of plasma DNA. The quantitative threshold can be adjusted according to the ambient temperature. For example, a higher threshold (e.g., higher concentration of plasma EBV DNA is required to define a positive result) can be used when the ambient temperature is lower whereas a lower threshold (e.g., lower concentration of plasma EBV DNA is required to define a positive result) when the ambient temperature is higher.

In view of the positive relationship between the age of a subject and EBV DNA concentration in plasma from the subject, strategies can be developed to enhance the cost-effectiveness of the screening program. For example, younger age groups can be encouraged to participate in the screening through a reduction of the testing fee. This arrangement can be useful when the cost of further investigation, for example nasal endoscopy or magnetic resonance imaging, can be reimbursed to those subjects who have been tested positive for plasma EBV DNA. The reimbursement can be tied to an insurance. A quantitative threshold can be applied to the level of plasma DNA. The quantitative threshold can be adjusted according to the age of the subject to be screened. For example, a higher threshold (e.g., higher concentration of plasma EBV DNA is required to define a positive result) can be used for older age groups whereas a lower threshold (e.g., lower concentration of plasma EBV DNA is required to define a positive result) for younger age groups.

Similar strategies can be used for adjusting the testing fees between smokers and non-smokers. The smokers can be charged a higher testing fee to compensate for the higher false-positive rates. This fee arrangement can be useful when the cost for further investigations is reimbursed to subjects who test positive for plasma EBV DNA. A quantitative threshold can be applied to the level of plasma DNA. The quantitative threshold can be adjusted according to the smoking habits of the subject to be screened. For example, a higher threshold (e.g., higher concentration of plasma EBV DNA is required to define a positive result) can be used for smokers whereas a lower threshold (e.g., lower concentration of plasma EBV DNA is required to define a positive result) can be used for non-smokers.

Computer System

Disclosed herein, in certain instances, are computer products comprising a computer readable medium storing a plurality of instructions for controlling a computer system to perform operations of any one of the methods described herein. Further disclosed herein, in certain instances, are systems comprising the computer product described herein and one or more processors for executing instructions stored on the computer readable medium.

Figure 3:
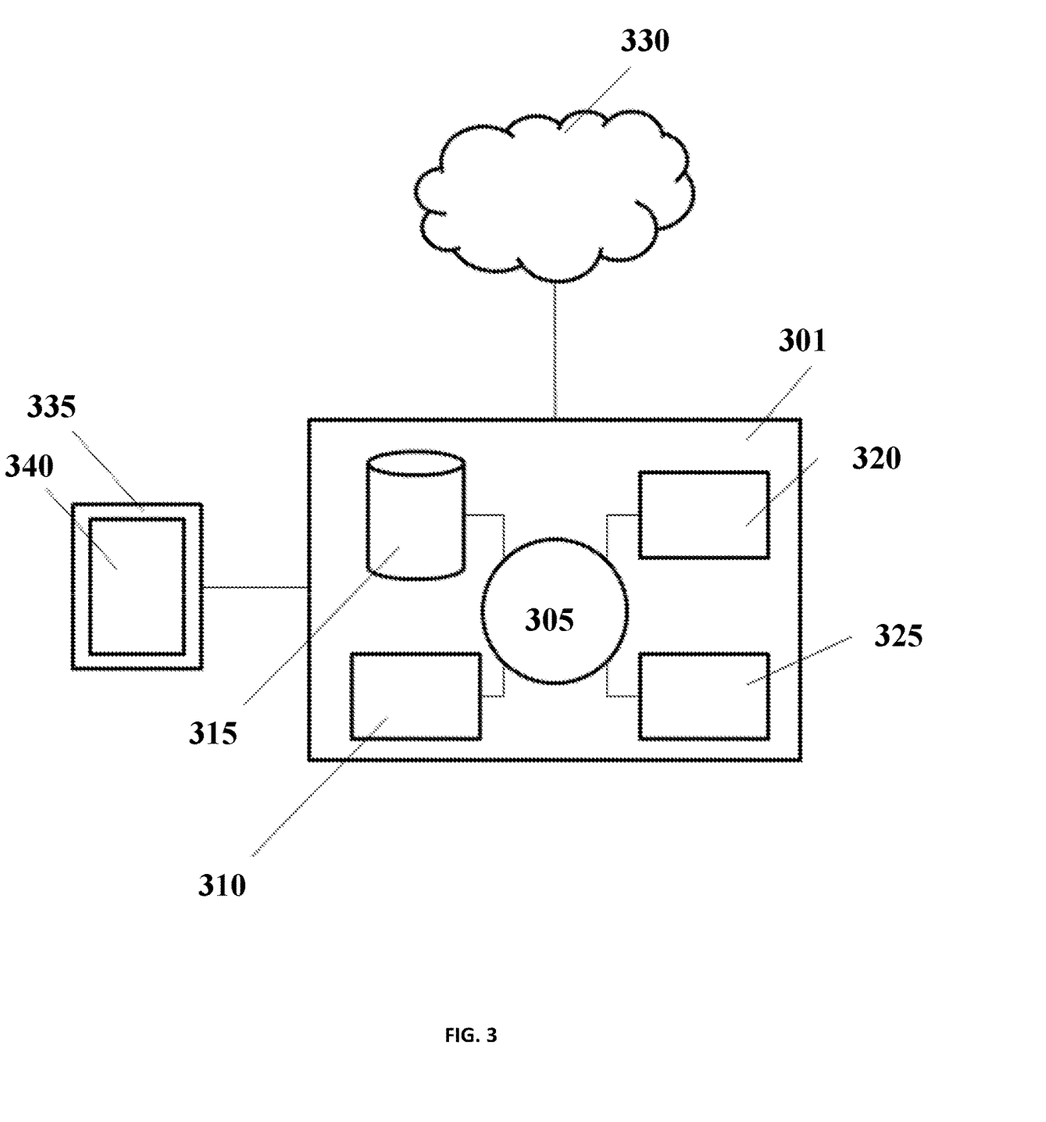
FIG. 3 illustrates a computer system that is programmed or otherwise configured to implement methods provided herein.

FIG. 3 shows a computer system 301 that is programmed or otherwise configured to communicate with and regulate various aspects of a computer system of the present disclosure.

The computer system 301 can regulate various aspects of the present disclosure, such as, for example, determining or adjusting a threshold of DNA of viral origin indicative of a tumor in a subject. The computer system 301 can be an electronic device of a user or a computer system that is remotely located with respect to the electronic device. The electronic device can be a mobile electronic device.

The computer system 301 can include a central processing unit (CPU, also "processor" and "computer processor"

herein) 305, which can be a single core or multi core processor, or a plurality of processors for parallel processing. The computer system 301 can also include memory or memory location 310 (e.g., random-access memory, read-only memory, flash memory), electronic storage unit 315 (e.g., hard disk), communication interface 320 (e.g., network adapter) for communicating with one or more other systems, and peripheral devices 325, such as cache, other memory, data storage and/or electronic display adapters. The memory 310, storage unit 315, interface 320 and peripheral devices 325 can be in communication with the CPU 305 through a communication bus (solid lines), such as a motherboard. The storage unit 315 can be a data storage unit (or data repository) for storing data. The computer system 301 can be operatively coupled to a computer network ("network") 330 with the aid of the communication interface 320. The network 330 can be the Internet, an internet and/or extranet, or an intranet and/or extranet that is in communication with the Internet. The network 330 in some cases is a telecommunication and/or data network. The network 330 can include one or more computer servers, which can enable distributed computing, such as cloud computing. The network 330, in some cases with the aid of the computer system 301, can implement a peer-to-peer network, which can enable devices coupled to the computer system 301 to behave as a client or a server.

The CPU 305 can execute a sequence of machine-readable instructions, which can be embodied in a program or software. The instructions can be stored in a memory location, such as the memory 310. The instructions can be directed to the CPU 305, which can subsequently program or otherwise configure the CPU 305 to implement methods of the present disclosure. Examples of operations performed by the CPU 305 can include fetch, decode, execute, and writeback.

The CPU 305 can be part of a circuit, such as an integrated circuit. One or more other components of the system 301 can be included in the circuit. In some cases, the circuit is an application specific integrated circuit (ASIC).

The storage unit 315 can store files, such as drivers, libraries and saved programs. The storage unit 315 can store user data, e.g., user preferences and user programs. The computer system 301 in some cases can include one or more additional data storage units that are external to the computer system 301, such as located on a remote server that is in communication with the computer system 301 through an intranet or the Internet.

The computer system 301 can communicate with one or more remote computer systems through the network 330. For instance, the computer system 301 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 301 via the network 330.

Methods as described herein can be implemented by way of machine (e.g., computer processor) executable code stored on an electronic storage location of the computer system 301, such as, for example, on the memory 310 or electronic storage unit 315. The machine executable or machine readable code can be provided in the form of software. During use, the code can be executed by the processor 305. In some cases, the code can be retrieved from the storage unit 315 and stored on the memory 310 for ready access by the processor 305. In some situations, the electronic storage unit 315 can be precluded, and machine-executable instructions are stored on memory 310.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 301, can be embodied in programming. Various aspects of the technology can be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which can provide non-transitory storage at any time for the software programming. All or portions of the software can at times be communicated through the Internet or various other telecommunication networks. Such communications, for example, can enable loading of the software from one computer or processor into another, for example, from a management server or host computer into the computer platform of an application server. Thus, another type of media that can bear the software elements includes optical, electrical and electromagnetic waves, such as used across physical interfaces between local devices, through wired and optical landline networks and over various air-links. The physical elements that carry such waves, such as wired or wireless links, optical links or the like, also can be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, can take many forms, including but not limited to, a tangible storage medium, a carrier wave medium or physical transmission medium. Non-volatile storage media include, for example, optical or magnetic disks, e.g., any of the storage devices in any computer(s) or the like, such as can be used to implement the databases, etc. shown in the drawings. Volatile storage media include dynamic memory, e.g., main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media can be involved in carrying one or more sequences of one or more instructions to a processor for execution.

The computer system 301 can include or be in communication with an electronic display 335 that comprises a user interface (UI) 340 for providing the use, for example, the ability to select a species of interest and gene of interest from the species of interest. Examples of UI's include, without limitation, a graphical user interface (GUI) and web-based user interface.

Any of the computer systems mentioned herein can utilize any suitable number of subsystems. In some cases, a computer system comprises a single computer apparatus, wherein the subsystems can be the components of the computer apparatus. In other cases, a computer system can include multiple computer apparatuses, each being a subsystem, with internal components. A computer system can include a desktop computer, a laptop computer, a tablet, a mobile phone, a wearable device, or any combination thereof.

The subsystems can be interconnected via a system bus. Additional subsystems can include a printer, keyboard, storage device(s), and monitor, which can be coupled to a display adapter. Peripherals and input/output (I/O) devices, which can couple to an I/O controller, can be connected to the computer system by any number of connections known in the art, such as an input/output (I/O) port (e.g., USB, FireWire®). For example, an I/O port or external interface (e.g., Ethernet, Wi-Fi, etc.) can be used to connect computer system to a wide area network such as the Internet, a mouse input device, or a scanner. The interconnection via system bus can allow the central processor to communicate with each subsystem and to control the execution of a plurality of instructions from system memory or the storage device(s) (e.g., a fixed disk, such as a hard drive, or optical disk), as well as the exchange of information between subsystems. The system memory and/or the storage device(s) can embody a computer readable medium. Another subsystem can be a data collection device, such as a camera, microphone, accelerometer, and the like. Any of the data mentioned herein can be output from one component to another component and can be output to the user.

Aspects of embodiments can be implemented in the form of control logic using hardware (e.g., an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments described herein using hardware and a combination of hardware and software.

Any of the software components or functions described in this application can be implemented as software code to be executed by a processor using any suitable computer language such as, for example, Java, C, C++, C#, Objective-C, Swift, or scripting language such as Perl or Python using, for example, conventional or object-oriented techniques. The software code can be stored as a series of instructions or commands on a computer readable medium for storage and/or transmission.

Certain Terminology

The terminology used herein is for the purpose of describing particular cases only and is not intended to be limiting. The below terms are discussed to illustrate meanings of the terms as used in this specification, in addition to the understanding of these terms by those of skill in the art. As used herein and in the appended claims, the singular forms "a", "an", and "the" include plural references unless the context clearly dictates otherwise. It is further noted that the claims can be drafted to exclude any optional element. As such, this statement is intended to serve as antecedent basis for use of such exclusive terminology as "solely," "only" and the like in connection with the recitation of claim elements, or use of a "negative" limitation.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating un-recited number may be a number which, in the context in which it is presented, provides the substantial equivalent of the specifically recited number. Where a range of values is provided, it is understood that each intervening value, to the tenth of the unit of the lower limit unless the context clearly dictates otherwise, between the upper and lower limit of that range and any other stated or intervening value in that stated range, is encompassed within the methods and compositions described herein are. The upper and lower limits of these smaller ranges can independently be included in the smaller ranges and are also encompassed within the methods and compositions described herein, subject to any specifically excluded limit in the stated range. Where the stated range includes one or both of the limits, ranges excluding either or both of those included limits are also included in the methods and compositions described herein.

The terms "individual," "patient," or "subject" can be used interchangeably. None of the terms require or are limited to situation characterized by the supervision (e.g. constant or intermittent) of a health care worker (e.g. a doctor, a registered nurse, a nurse practitioner, a physician's assistant, an orderly, or a hospice worker). Further, these terms can refer to human or animal subjects.

"Treating" or "treatment" can refer to both therapeutic treatment and prophylactic or preventative measures, wherein the object can be to prevent or slow down (lessen) a targeted pathologic condition or disorder. Those in need of treatment can include those already with the disorder, as well as those prone to have the disorder, or those in whom the disorder is to be prevented. For example, a subject (e.g., mammal) can be successfully "treated" for a tumor, if, after receiving a therapy, the subject shows observable and/or measurable reduction in or absence of one or more of the following: reduction in the number of cancer cells or absence of the cancer cells; reduction in the tumor size; inhibition (i.e., slowing to some extent and preferably stopping) of cancer cell infiltration into peripheral organs, including the spread of cancer into soft tissue and bone; inhibition (i.e., slowing to some extent and preferably stopping) of tumor metastasis; inhibition, to some extent, of tumor growth; and/or relief to some extent of one or more of the symptoms associated with the specific cancer; reduced morbidity and/or mortality, and improvement in quality of life issues.

The following examples provide non-limiting illustrations of certain aspects of the invention.

EXAMPLES

Example 1. Determination of Factors Affecting Detectability of Plasma EBV DNA in Non-NPC Subjects The factors that might affect the positive rate of plasma EBV DNA in participants without NPC were investigated. This group of subjects can undergo follow-up with further investigation and represented false-positive screening cases in the context of NPC screening. The identification of factors that associated with detectable plasma EBV DNA in non-NPC subjects can be used to reduce the number of false-positive screening results.

In this study, the 20,138 participants (males 40 to 62 years of age) who enrolled to the NPC screening study but did not have NPC within 3 years after screening were analyzed. Their demographic data, co-morbidities, as well as the mean ambient temperature on the day of screening were analyzed. The ambient temperature was obtained from the Hong Kong Observatory. Univariate analysis was first performed and followed by multi-variate logistic regression to identify factors independently associated with detectable plasma EBV DNA.

A univariate analysis was carried out to investigate the effects of individual factors on the detectability of plasma EBV DNA. The factors tested individually were age, current smoking status, current drinking status, exercise habit, diabetes mellitus status, hypertension status, hyperlipidemia status, and ischemic heart disease.

Figure 1:
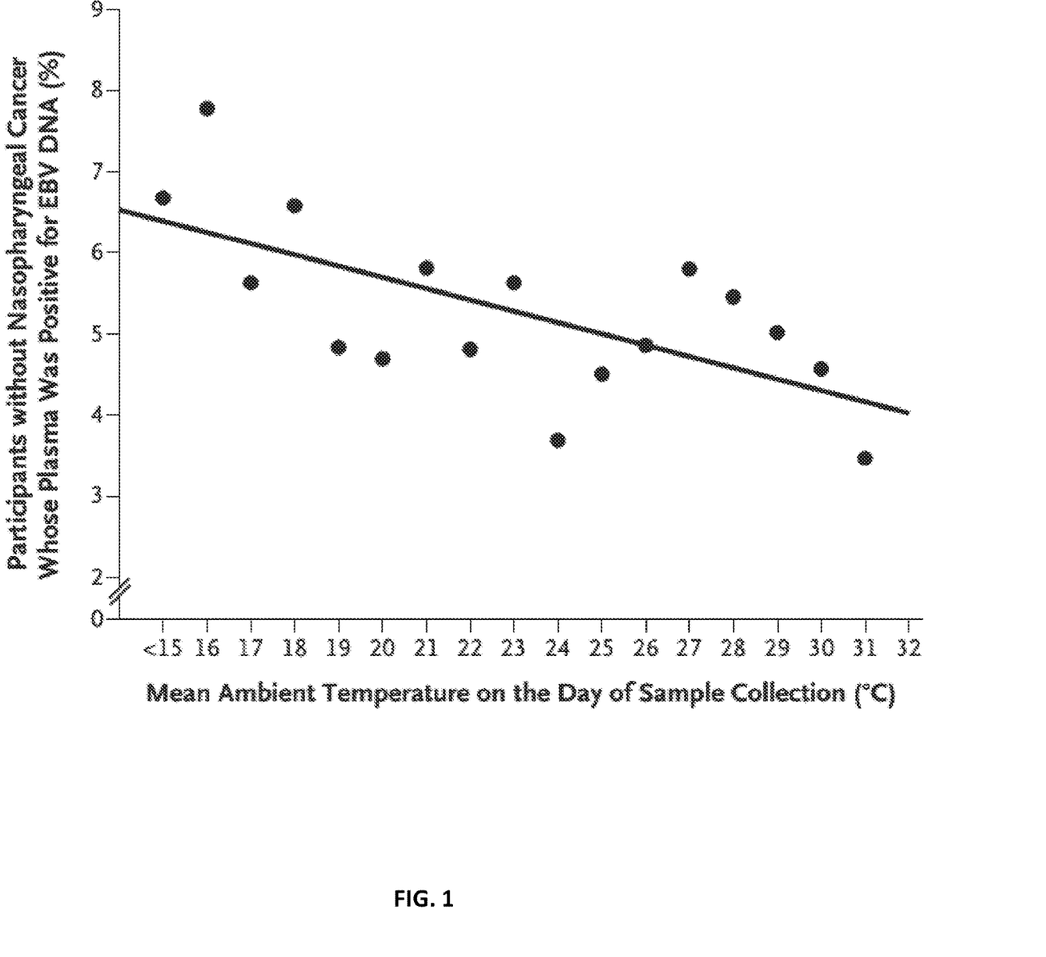
FIG. 1 illustrates the correlation between age and detectability of plasma Epstein-Barr virus (EBV) DNA in non-NPC subjects.

There was a positive correlation between age and detectable plasma EBV DNA (P<0.001, R=0.651, linear regression; see FIG. 1). Each 5-year increase in age was associated with a 0.6% increase in the positive rate of plasma EBV DNA.

There was a statistically significant relationship between current smoking status and detectable plasma EBV DNA (P<0.001, Chi-square test; Table 1). The odds ratio was 1.48.

TABLE 1

Number of individuals with undetectable and detectable plasma EBV DNA based on current smoking status

| | Current smokers | Non-current-smokers |
|---|---|---|
| Undetectable plasma EBV DNA | 3748 | 15312 |
| Detectable plasma EBV DNA | 286 | 792 |

There was no statistically significant relationship between alcohol consumption and detectable plasma EBV DNA (P=0.9086, Chi-square test; Table 2).

TABLE 2

Number of individuals with undetectable and detectable plasma EBV DNA based on current drinking status

| | Current drinkers | Non-current drinkers |
|---|---|---|
| Undetectable plasma EBV DNA | 12761 | 6299 |
| Detectable plasma EBV DNA | 720 | 358 |

There was no correlation between exercise habit and detectable plasma EBV DNA (P=0.7441, Chi-square test; Table 3). Regular exercise was defined as having at least 30 minutes of moderate exercise on at least two days per week.

TABLE 3

Number of individuals with undetectable and detectable plasma EBV DNA based on exercise habit

| | With regular exercise | Without regular exercise |
|---|---|---|
| Undetectable plasma EBV DNA | 13375 | 5683 |
| Detectable plasma EBV DNA | 751 | 327 |

There was a statistically significant effect between diabetes mellitus and detectable plasma EBV DNA (P=0.012, Chi-square test; Table 4).

TABLE 4

Number of individuals with undetectable and detectable plasma EBV DNA based on diabetes mellitus status

| | Without diabetes mellitus | With diabetes mellitus |
|---|---|---|
| Undetectable plasma EBV DNA | 17929 | 1131 |
| Detectable plasma EBV DNA | 993 | 85 |

There was a statistically significant relationship between hypertension and detectable plasma EBV DNA (P=0.009, Chi-square test; Table 5).

TABLE 5

Number of individuals with undetectable and detectable plasma EBV DNA based on hypertension status

| | Without hypertension | With hypertension |
|---|---|---|
| Undetectable plasma EBV DNA | 17929 | 1131 |
| Detectable plasma EBV DNA | 993 | 85 |

There is no statistically significant relationship between hyperlipidemia and detectable plasma EBV DNA (P=0.18, Chi-square test; Table 6).

TABLE 6

Number of individuals with undetectable and detectable plasma EBV DNA based on hyperlipidemia status

| | Without hyperlipidemia | With hyperlipidemia |
|---|---|---|
| Undetectable plasma EBV DNA | 16788 | 2272 |
| Detectable plasma EBV DNA | 935 | 143 |

There was no statistically significant relationship between ischemic heart disease and detectable plasma EBV DNA (P=0.06, Chi-square test; Table 7).

TABLE 7

Number of individuals with undetectable and detectable plasma EBV DNA based on ischemic heart disease status

| | Without ischemic heart disease | With ischemic heart disease |
|---|---|---|
| Undetectable plasma EBV DNA | 18503 | 557 |
| Detectable plasma EBV DNA | 1035 | 43 |

There was a negative correlation between temperature and detectable plasma EBV DNA (P<0.001, R=0.651, linear regression; FIG. 2). Each 5° C. drop in mean ambient temperature was associated with a 0.85% increase in the positive rate of plasma EBV DNA.

To further investigate if these factors were independently associated with detectable plasma EBV DNA, a multi-variate logistic regression analysis was performed.

In the multi-variate logistic regression analysis, only age, current smoking status and ambient temperature were independently associated with increased detectability of plasma EBV DNA (Table 8). The effect of diabetes mellitus and hypertension on plasma EBV DNA was likely confounded by age because these two conditions are more prevalent in older age groups. Based on the multi-variate analysis, smokers were 1.59-fold more likely to have detectable plasma EBV DNA than non-smokers.

TABLE 8

Multi-variate logistic regression for factors affecting the detectability of plasma EBV DNA in non-NPC subjects

| | Regression coefficient | Standard error | P-value |
|---|---|---|---|
| Age | 0.033 | 0.005 | <0.001 |
| Current smoking status | 0.463 | 0.072 | <0.001 |
| Ambient temperature | −0.022 | 0.006 | <0.001 |
| Diabetes mellitus | 0.152 | 0.121 | 0.207 |
| Hypertension | 0.096 | 0.082 | 0.243 |

The increase in positive rate of plasma EBV DNA in non-NPC subjects was likely due to the presence of transient viral replication. In the context of NPC screening, the presence of detectable plasma EBV DNA in non-NPC subjects can represent false-positive screening results and can require investigation with nasal endoscopy and MRI. Therefore, the reduction of detection rate of plasma EBV DNA in non-NPC subjects can enhance the cost-effectiveness of the screening program. See Chan et al. (2018) Ambient Temperature and Screening for Nasopharyngeal Cancer. *NEJM* 378: 962-963).

Example 2. Detection of Plasma EBV

A plasma sample is taken from a 60 year old woman with a smoking habit suspected of having nasopharyngeal carcinoma (NPC). The concentration of EBV DNA in the plasma sample is measured with the use of a real-time quantitative PCR (qPCR) of the BamHI-W region of the EBV genome. Real-time quantitative PCR of the β-globin gene is also carried out to serve as a control. Three replicates of each qPCR reaction are carried out. A calibration curve is run in parallel for each qPCR with the use of DNA from an EBV-positive cell line as the standard. Concentration of plasma EBV DNA is determined and is expressed as the number of copies of the EBV genome per milliliter of plasma.

The baseline threshold plasma EBV DNA level is set at 100,000 copies/mL. However, given that the woman is a smoker, the threshold is set 10% higher, to 110,000 copies/mL. The amount of plasma EBV DNA detected in the woman is 100,500 copies/mL. Given that this is lower than the adjusted threshold, this woman is not suspected of having NPC and no further screening is performed.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of screening and treating a subject for a tumor, the method comprising selecting a subject, and based on said selecting, administering a treatment to the subject effective to treat a tumor in the subject, wherein:
  a) the selecting comprises (i) receiving results of an assay of a biological sample of the subject measuring an amount of cell-free nucleic acid from an Epstein-Barr Virus (EBV) in the biological sample, and (ii) identifying the amount of EBV cell-free nucleic acid in the biological sample as being above a threshold amount;
  b) the threshold amount distinguishes reference biological samples of reference subjects with a known tumor from reference biological samples of reference subjects without the known tumor;
  c) the subject and the reference subjects are characterized by one or more of the following:
    (i) age above 45 years old;
    (ii) smoking status is a smoker; or
    (iii) mean outdoor ambient temperature on a day the respective biological samples were collected at a location within 50 km of a location at which the respective biological samples were collected is below 30° C.; and
  d) the treatment is selected from the group consisting of: chemotherapy, radiation therapy, surgery, and antibody therapy.

2. The method of claim 1, wherein the subject and the reference subjects are characterized by the smoking status of smoker.

3. The method of claim 2, wherein the threshold is at least 20% higher than a threshold amount for a non-smoker.

4. The method of claim 1, wherein the subject and reference subjects are characterized by age above 45 years old.

5. The method of claim 4, wherein the threshold amount is increased by at least 2% for every block of 5 years that the age of the subject is above 45 years old.

6. The method of claim 1, wherein the subject and reference subjects are characterized by the mean outdoor ambient temperature on the day the biological samples were collected at the location within 50 km of a location at which the respective biological samples were collected is below 30° C.

7. The method of claim 6, wherein the threshold amount is increased by at least 1% for every block of 3 degrees that the mean outdoor ambient temperature on the day the biological sample of the subject was collected at the location within 50 km of a location at which the biological sample of the subject was collected is below 30° C.

8. The method of claim 1, wherein the subject and reference subjects are characterized by each of the following:
  (i) above 45 years old;
  (ii) smoking status is a smoker; and
  (iii) the mean outdoor ambient temperature on the day the respective biological samples were collected at the location within 50 km of a location at which the biological samples were collected is below 30° C.

9. The method of claim 1, wherein the treatment comprises chemotherapy.

10. The method of claim 1, wherein the amount of EBV cell-free nucleic acid in the biological sample comprises at least 100 copies of the cell-free nucleic acid from EBV per milliliter (copies/mL).

11. The method of claim 1, wherein the selecting further comprises identifying the subject as the source of a second biological sample comprising a second indicator of presence of the tumor.

12. The method of claim 11, wherein the second indicator comprises a size of cell-free nucleic acid from the EBV in the second biological sample from the subject.

13. The method of claim 12, wherein the second biological sample is identical to the biological sample.

14. The method of claim 12, wherein the second biological sample is different from the biological sample.

15. The method of claim 12, wherein the second indicator comprises an amount of cell-free nucleic acid from the second biological sample from the subject that is from the EBV and has a size within a given range.

16. The method of claim 15, wherein the amount of the cell-free nucleic acid that is from the EBV and has a size within the given range is based on results for massively parallel sequencing of the cell-free nucleic acid from the second biological sample.

17. The method of claim 1, wherein the biological sample comprises plasma or serum.

18. The method of claim 1, wherein the amount of EBV cell-free nucleic acid in the biological sample is determined by amplification of the cell-free nucleic acid.

19. The method of claim 18, wherein the amplification comprises polymerase chain reaction (PCR).

20. The method of claim 19, wherein the PCR comprises quantitative PCR (qPCR).

21. The method of claim 1, wherein the tumor is nasopharyngeal cancer.

22. The method of claim 1, wherein the treatment comprises radiation therapy.

23. The method of claim 1, wherein the treatment comprises surgical removal of tumor tissue.

24. The method of claim 1, wherein the treatment comprises antibody therapy.

25. The method of claim 24, wherein the antibody therapy comprises administering a monoclonal antibody.

26. The method of claim 24, wherein the antibody therapy comprises administering bevacizumab, cetuximab, or nivolumab.

27. The method of claim 1, wherein the tumor in the subject and the known tumor of the reference subjects comprise a nasopharyngeal cancer.

28. The method of claim 1, wherein the tumor in the subject and the known tumor of the reference subjects comprise a lymphoma or a stomach cancer.

* * * * *